United States Patent Office 2,949,396
Patented Aug. 16, 1960

2,949,396

WET STRENGTH PAPER

Francis A. Bonzagni, Springfield, Mass., assignor to Monsanto Chemical Company, St. Louis, Mo., a corporation of Delaware No Drawing. Filed May 23, 1956, Ser. No. 586,656

7 Claims. (Cl. 162—167)

The present invention relates to paper having good wet tensile strength and to methods for preparing same. More particularly, the present invention relates to paper having certain novel resins deposited upon the fibers thereof to enhance its wet tensile strength.

It is known that the deposition of certain resins on the fibers of paper will significantly enhance the wet tensile strength of the paper. Such resin-impregnated papers are referred to generically in the art as wet strength papers. Although the presently available wet strength papers constitute a major technical advance, the art continues to seek papers having still higher wet tensile strengths.

A limiting feature of the wet strength papers presently available is that the paper, as it is manufactured and comes off the Fourdrinier machine, has only a small percentage of its ultimate wet tensile strength. To develop its ultimate wet tensile strength, the paper, after its manufacture, must be heated to elevated temperatures or aged for relatively long periods of time at ambient air temperature. Either subsequent treatment procedure entails an extra processing step in manufacture and adds to the cost of the paper.

It is an object of this invention to provide paper having improved wet tensile strength and to methods for preparing same.

Another object of this invention is to provide paper having certain novel resins deposited on the fibers thereof to improve its wet tensile strength.

Still another object of this invention is to provide paper having a high percentage of its ultimate wet tensile strength as manufactured and which does not require a subsequent heat or aging treatment to develop high wet tensile strength.

Other objects and advantages of this invention will become apparent from the following detailed description thereof.

It has been discovered that paper having high wet tensile strength can be prepared by depositing certain novel resins on the paper fibers. Such resins are water-dispersible, acid-aged, cationic, sulfite-modified, melamine-formaldehyde resins which, before acid aging, contains 2.5–4.5 mols of formaldehyde and up to 0.2 mol of sulfonate groups per mol of melamine and have a viscosity of at least about 300 centipoises when measured in a 55% aqueous solution at 25° C. A very desirable feature of the wet strength papers of this invention is that they have a high percentage of their ultimate wet tensile strength as manufactured on the Fourdrinier machine and do not require post manufacture heating or long aging to develop high wet tensile strength.

The following examples are set forth to illustrate more clearly the principle and practice of this invention to those skilled in the art. All parts are by weight.

EXAMPLE I

*Part A*

A sulfite-modified, melamine-formaldehyde resin is prepared by reacting together 1 molar proportion of melamine, 3.6 molar proportions of formaldehyde (charged as a 37% formalin solution) and 0.17 molar proportion of sodium bisulfite. After mixing the reactants together and adjusting the pH of the solution to 9.5 with sodium hydroxide, the reaction mixture is heated for five hours at a temperature of 95–100° C. The pH of the reaction mixture is followed and sodium hydroxide is added throughout the reaction period as required to maintain the pH between 9.0 and 9.5. The resin is obtained as a 55% aqueous solution which has a viscosity of 1500 centipoises at 25° C. The resin is recovered as a dry powder by spray-drying.

*Part B*

The resin of Part A is converted into a water-dispersed cationic colloid by dissolving 12 parts of resin in 88 parts of water, adding 6 parts of 37% hydrochloric acid thereto and aging the solution for three hours at 70° F. The resulting solution has a bluish cast and the resin particles carry a positive charge. The colloidal resin solution is diluted to 3% resin solids and does not undergo any measurable change in physical properties when stored for periods of up to at least 30 days. In the subsequent Examples III–XI, the 3% colloidal resin solution is permitted to stand for 16 hours at room temperature before use.

EXAMPLE II

*Part A*

An unmodified melamine-formaldehyde resin is prepared as a control resin to be employed in comparing the wet tensile strength imparting properties of the novel sulfite-modified melamine-formaldehyde resins employed in the practice of this invention. This control resin is prepared by reacting 1 molar proportion of melamine with 3.6 molar proportions of formaldehyde at 90–100° C. at a pH of 9.0–9.5. The resin is polymerized to the extent that a 60% aqueous solution thereof separates into two phases when cooled to 20° C. The resin is recovered by spray drying and corresponds in properties to those of the commercially available melamine-formaldehyde resins that are employed in the manufacture of wet strength paper.

*Part B*

A cationic colloid of the resin of Part A above is prepared as described in Example I, Part B, except that only 4.8 parts of 37% hydrochloric acid are employed. The lower quantity of acid is employed as maximum resin properties are obtained therewith. The colloidal solution has a blue haze and the resin particles carry a positive charge. The colloidal resin solution is stable for at least 30 days at room temperature. The colloidal resin solution is permitted to stand for 16 hours at room temperature before use in the subsequent examples.

In several of the subsequent examples the physical properties of paper sheets are reported. In all cases, the sheets are prepared on a Noble and Wood sheet machine with the paper sheets measuring 8 inches by 8 inches and weighing 2.5 grams. The sheets are dried for 6 minutes at 200–205° F. to approximate the heat history of paper prepared on commercial Fourdrinier machines. Tensile data are obtained on a Schopper tensile tester and the results are reported on the basis of pounds per inch width unless otherwise noted. The sheets on which wet tensile strengths are determined are wetted by thoroughly soaking the paper sheet in distilled water and removing the excess water by pressing the sheets tightly between large blotters.

EXAMPLE III

The acid colloid of the sulfite-modified, melamine-formaldehyde resin prepared in Example I, Part B, is evaluated at several levels of resin concentration by incorporating the resin in an unbleached northern kraft pulp furnish. Two parts of alum are included in the furnish and the pH thereof is adjusted to 4.5 before preparing the paper sheets. For purposes of comparison, similar papers are prepared from northern kraft furnishes containing the control, unmodified melamine-formaldehyde resin colloid prepared in Example II, Part B. The levels of resin concentration employed and the wet tensile strength of the resulting sheets are shown in Table I.

TABLE I

| Resin | Wt. Percent Resin On Paper | Wet Tensile, lbs./inch |
| --- | --- | --- |
| Sulfited Melamine Resin—Expl. I, Part B | 0.5 | 2.1 |
| | 1.0 | 3.2 |
| | 1.5 | 4.3 |
| | 2.5 | 5.0 |
| | 4.0 | 7.0 |
| Control—Nonsulfited Melamine Resin—Expl. II, Part B | 0.5 | 1.4 |
| | 1.0 | 2.3 |
| | 1.5 | 3.0 |
| | 2.5 | 3.7 |
| | 4.0 | 5.4 |

At each level of resin concentration materially higher wet tensile strengths are obtained with the sulfite-modified resin.

EXAMPLE IV

Example III is repeated except that the resins are incorporated in a bleached sulfite pulp furnish containing 5% alum. The concentrations of resin employed and the wet tensile strength of the resulting sheets are set forth in Table II.

TABLE II

| Resin | Wt. Percent Resin On Paper | Wet Tensile, lbs./inch |
| --- | --- | --- |
| Sulfited Melamine Resin—Expl. I, Part B | 0.5 | 1.7 |
| | 1.0 | 2.4 |
| | 1.5 | 2.8 |
| | 2.5 | 3.8 |
| Control—Nonsulfited Melamine Resin—Example II, Part B | 0.5 | 0.9 |
| | 1.0 | 1.2 |
| | 1.5 | 1.5 |
| | 2.0 | 1.5 |

Materially higher wet tensile strengths are obtained with the sulfite-modified resin.

EXAMPLE V

Example III is repeated except that the resins are incorporated in a high alpha cellulose pulp furnish. The results are set forth in Table III.

TABLE III

| Resin | Wt. Percent Resin On Paper | Wet Tensile, lbs./inch |
| --- | --- | --- |
| Sulfited Melamine Resin—Expl. I, Part B | 1.0 | 1.0 |
| | 2.0 | 1.4 |
| | 3.0 | 1.9 |
| | 4.0 | 2.2 |
| Control—Nonsulfited Melamine Resin—Example II, Part B | 1.0 | 0.6 |
| | 2.0 | 0.7 |
| | 3.0 | 0.7 |
| | 4.0 | 0.9 |

As in Examples III and IV, materially superior results are obtained with the sulfite-modified resin.

EXAMPLE VI

Example III is repeated except that the resin is incorporated in a bleached southern kraft pulp furnish. The results are set forth in Table IV.

TABLE IV

| Resin | Wt. Percent Resin On Paper | Wet Tensile, lbs./inch |
| --- | --- | --- |
| Sulfited Melamine Resin—Expl. I, Part B | 0.5 | 1.7 |
| | 1.0 | 2.4 |
| | 1.5 | 2.9 |
| | 2.5 | 4.1 |
| Control—Nonsulfited Melamine Resin—Example II, Part B | 0.5 | 1.3 |
| | 1.0 | 1.8 |
| | 1.5 | 2.3 |
| | 2.5 | 2.8 |

As in Examples III, IV and V, markedly higher wet tensile values are obtained with the sulfite-modified resin.

EXAMPLE VII

Several sulfite-modified, melamine-formaldehyde resins of varying degrees of polymerization are prepared to illustrate the effect of resin molecular weight (measured by viscosity) on the wet strength generating properties of the acid-aged colloid prepared therefrom. To this end, Example I, Part A, is repeated except that the reaction mixture is heated at 95–100° C. until the resin has a viscosity of 7000 centipoises as measured in a 55% aqueous solution at 25° C. Aliquots of the resin are withdrawn when the viscosities of 55% aqueous solutions thereof reach 500, 1000, 1500 and 7000 centipoises, and these aliquots are converted into acid-aged colloids as described in Example I, Part B. These resin colloids are incorporated in a northern kraft pulp furnish at a level of 1.5% resin based on the dry weight of the paper fibers. The wet tensile strengths of the resulting sheets are set forth in Table V.

TABLE V

| Resin Viscosity, Centipoises [1] | Wet Tensile, lbs./inch |
| --- | --- |
| 500 | 4.7 |
| 1,000 | 4.8 |
| 1,500 | 5.0 |
| 7,000 | 5.1 |

[1] Determine in 55% aqueous solution at 25° C.

It is seen from the above Table V that the wet tensile strength of the paper increases with the viscosity of the sulfite-modified, melamine-formaldehyde resin from which the acid-aged colloid is prepared. Other data indicate that the wet tensile strength properties of the paper fall off rather rapidly when the viscosity of the sulfite-modified, melamine-formaldehyde resin is less than about 300 centipoises when measured in a 55% aqueous solution at 25° C.

EXAMPLE VIII

Four resins modified with varying amounts of sodium sulfite are prepared to illustrate the effect of the resin sulfonate group content upon the wet tensile strength properties of paper prepared therefrom. The four resins are prepared by the procedure described in Example I, Part A, except that the molar proportion of sodium bisufite per mol of melamine included in the reaction mixture is adjusted to, respectively, 0.12, 0.14, 0.17 and 0.19. Acid-aged colloids of the resins are prepared as described in Example I, Part B. The resulting acid-aged resin colloids are incorporated at the 1.5% level in a high alpha cellulose pulp furnish. The wet tensile strengths of the resulting sheets are set forth in Table VI.

TABLE VI

| Mols Sulfite/Mol Melamine | Wet Tensile, lbs./inch |
| --- | --- |
| 0.12 | 2.1 |
| 0.14 | 2.2 |
| 0.17 | 2.0 |
| 0.19 | 1.6 |

As seen in the above Table VI, the wet tensile strength properties of the paper fall off markedly when the sulfonate group content of the resin colloid approaches 0.2 mol of sulfonate groups per mol of melamine.

EXAMPLE IX

The quantity of acid employed in preparing the acid-aged colloid of the sulfite-modified, melamine-formaldehyde resin has only a small effect upon the wet tensile strength properties of the paper prepared therefrom as illustrated by this example. Three acid-aged colloids of the resin of Example I, Part A, are prepared as described in Example I, Part B, except that the quantity of 37% hydrochloric acid employed is adjusted to 4.7 parts, 5.9 parts and 7.1 parts. These quantities of acid are sufficient to constitute, respectively, 14%, 18% and 29% of anhydrous hydrogen chloride on the resin solids. The resulting acid-aged resin colloids are incorporated at the 1.5% level in a high alpha cellulose pulp furnish. The wet tensile strengths of the resulting sheets are set forth in Table VII.

TABLE VII

| Amount HCl Employed—Parts HCl/100 parts resin | Wet Tensile, lbs./inch |
|---|---|
| 14 | 2.6 |
| 18 | 2.7 |
| 29 | 2.4 |

EXAMPLE X

Papers prepared with the cationic resin colloids of this invention develop a greater percentage of their ultimate wet tensile strength as manufactured, than do corresponding papers prepared with cationic colloids of conventional melamine-formaldehyde resins. To illustrate this fact, paper is prepared from 4 different pulps, high alpha cellulose pulp, bleached southern kraft pulp, bleached sulfite pulp and unbleached northern kraft pulp. The cationic resin colloid of Example I, Part B, is incorporated into the pulp furnish at several different resin levels, and sheets are prepared therefrom by the standard procedure previously described. For comparison purposes, similar papers are prepared employing the cationic resin colloid of the unmodified melamine-formaldehyde resin of Example II, Part B. In addition, papers prepared by the previously described standard procedure are aged for 30 minutes at 220° F. to further cure the wet strength resins and develop the optimum wet tensile strength of the papers.

Details as to the composition of the papers tested, the uncured and cured wet tensile strengths thereof and the percentages of the ultimate wet tensile strength obtained in the paper as manufactured, i.e., after drying for 6 minutes at 200° F., are set forth in Table VIII.

From Table VIII it will be noted that with each pulp type studied, and at each resin level in said pulp, paper prepared with the cationic, sulfite-modified, melamine-formaldehyde resin colloid develops a higher

TABLE VIII

| Type Pulp | Resin | Wt. Percent Resin On Paper | Uncured [1] Wet Tensile | Cured [2] Wet Tensile | Tu/Tc×100 [3] |
|---|---|---|---|---|---|
| High Alpha Cellulose | Sulfited Melamine Resin—Expl. I, Part B | 1.0 | 1.0 | 3.8 | Percent 26 |
| | | 2.0 | 1.4 | 4.9 | 28 |
| | | 3.0 | 1.9 | 6.1 | 31 |
| | | 4.0 | 2.2 | 6.9 | 32 |
| | | | | | Ave.=30 |
| | Control—Non-sulfited Melamine Resin—Expl. II, Part B | 1.0 | 0.60 | 3.2 | 19 |
| | | 2.0 | 0.70 | 4.4 | 16 |
| | | 3.0 | 0.70 | 4.6 | 15 |
| | | 4.0 | 0.94 | 6.2 | 15 |
| | | | | | Ave.=16 |
| Bleached Southern Kraft | Sulfited Melamine Resin—Expl. I, Part B | 1.0 | 2.4 | 3.7 | 65 |
| | | 1.5 | 2.9 | 4.5 | 64 |
| | | 2.5 | 4.1 | 5.9 | 70 |
| | | | | | Ave.=66 |
| | Control—Non-sulfited Melamine Resin—Expl. II, Part B | 1.0 | 1.8 | 3.3 | 55 |
| | | 1.5 | 2.3 | 4.3 | 54 |
| | | 2.5 | 2.8 | 5.6 | 50 |
| | | | | | Ave.=53 |
| Bleached Sulfite | Sulfited Melamine Resin—Expl. I, Part B | 1.0 | 2.4 | 3.1 | 78 |
| | | 1.5 | 2.8 | 3.8 | 74 |
| | | 2.5 | 3.8 | 5.0 | 76 |
| | | | | | Ave.=76 |
| | Control—Non-sulfited Melamine Resin—Expl. I, Part B | 1.0 | 1.2 | 2.2 | 55 |
| | | 1.5 | 1.5 | 2.7 | 56 |
| | | 2.5 | 1.5 | 3.3 | 46 |
| | | | | | Ave.=52 |
| Unbleached Northern Kraft | Sulfited Melamine Resin—Expl. I, Part B | 0.5 | 2.1 | 3.5 | 60 |
| | | 1.0 | 3.2 | 5.2 | 62 |
| | | 1.5 | 4.3 | 6.5 | 66 |
| | | 2.5 | 5.0 | 7.5 | 67 |
| | | | | | Ave.=64 |
| | Control—Non-sulfited Melamine Resin—Expl. II, Part B | 0.5 | 1.5 | 3.1 | 48 |
| | | 1.0 | 2.3 | 5.0 | 46 |
| | | 1.5 | 3.0 | 5.9 | 51 |
| | | 2.5 | 3.6 | 7.5 | 48 |
| | | | | | Ave.=48 |

[1] Uncured wet tensile=sheet dried 6 minutes @200° F.
[2] Cured wet tensile=sheet dried 6 minutes @ 200° F. and heated 30 minutes @ 220° F.
[3] Tu/Tc=Uncured wet tensile/cured wet tensile.

percentage of its ultimate wet tensile strength as manufactured, i.e., when dried only 6 minutes at 200° F., than does the control.

EXAMPLE XI

A further outstanding characteristic of the papers of this invention is that they have high brightness values, i.e. they reflect a high percentage of incident light and appear very bright. To illustrate this feature of the invention, 4 batches of paper are prepared employing the acid colloid of a sulfited melamine resin containing 0.14 mol of sulfonate groups per mol of melamine. The resin colloid employed is described in Example VIII. The resin colloid is incorporated in a high alpha cellulose pulp furnish containing 2% alum in amounts sufficient to constitute, respectively, 2.0%, 3.0%, 4.0% and 5.0% of the paper-making fibers. For purposes of comparison, 4 similar batches of paper are prepared employing the acid colloid of the nonsulfited melamine resin described in Example II, Part B. The color of the two resin colloid solutions incorporated in the paper furnishes are substantially identical. The brightness values of the two sets of paper are determined by TAPPI Method 452 m–48 employing a Wratten #49 blue filter. The results are set forth in Table IX.

TABLE IX

| Resin | Resin Level | Reflectance, percent |
|---|---|---|
| Sulfited Melamine Resin | 2.0 | 73 |
|  | 3.0 | 73 |
|  | 4.0 | 73 |
|  | 5.0 | 74 |
| Control Non-sulfited Melamine Resin—Expl. II, Part B. | 2.0 | 70 |
|  | 3.0 | 69 |
|  | 4.0 | 68 |
|  | 5.0 | 68 |

From the above table it is seen that paper prepared with the sulfited melamine resin is appreciably brighter than paper prepared with the control nonsulfited melamine resin at each resin level tested. In addition, the brightness of the papers of this invention remains constant or increases as the concentration of the resin incorporated in the paper is increased, whereas the brightness of the papers prepared from the prior art nonsulfited melamine resin decreases as the concentration of resin incorporated in the paper is increased.

The resins employed in the preparation of the high wet strength papers of this invention are water-dispersible, acid-aged, cationic, sulfite-modified, melamine-formaldehyde resins having critical molecular proportions and degrees of polymerization as subsequently set forth in greater detail. The term "water-dispersible resin" is used in a generic sense to cover truly water-soluble resins as well as colloidally dispersible resins.

The sulfite-modified, melamine-formaldehyde resins from which the acid-aged, cationic resins are prepared contain for each mol of melamine 2.5–4.5 mols and preferably 3.0–4.0 mols of formaldehyde, with optimum properties being obtained in resins containing 3.6 mols of formaldehyde. Similarly, the resins should contain up to 0.2 mol and preferably 0.10–0.18 mol of sulfonate groups per mol of melamine, with optimum properties being obtained in resins containing 0.12–0.15 mol of sulfonate groups per mol of melamine. The resins should never contain more than about 0.2 mol of sulfonate groups per mol of melamine as the resulting resins coagulate and precipitate when placed in contact with strong acids and as a result are inoperable in the practice of this invention.

The sulfite-modified, melamine-formaldehyde resins should have a high degree of polymerization before they are converted into cationic colloids by acid aging. The degree of polymerization can be measured conveniently by the viscosity of the resin in aqueous solution. As set forth in Example VII, resins prepared under otherwise identical conditions impart higher wet strength to paper as the viscosity of the resin is increased. To be suitable for use in this invention, the sulfite-modified, melamine-formaldehyde resins should, before being converted into a cationic colloid by acid aging, have a viscosity of at least about 300 centipoises when measured in a 55% solution at 25° C. The only upper limit on the viscosity of the resin is the consideration that it must dissolve in the strong acid solution employed to convert that resin into a water-dispersible, cationic colloid.

The sulfite-modified, melamine-formaldehyde resins are conveniently prepared by inter-reacting melamine, formaldehyde and an alkali metal bisulfite or a progenitor thereof in an aqueous solution. Preferably, such reactions are carried out in alkaline solutions, e.g. at a pH of 8.5 or higher.

The sulfite-modified, melamine-formaldehyde resins are converted into cationic colloids by treating said resins with strong acid solutions. For the development of optimum properties, the sulfite-modified, melamine-formaldehyde resin is dissolved or dispersed in water and the acid is added thereto. Alternatively, the resin can be added to a strong acid solution.

The quantity of acid employed in preparing the cationic resin colloids is sufficient to adjust the pH of the resin solution to the range of 0.5–3.5 and preferably 1.5–2.5. It is preferred to employ hydrochloric acid in the preparation of the cationic resin, but other strong acids such as phosphoric acid, formic acid, etc. also may be employed if desired.

The efficiency of the cationic resins in enhancing the wet tensile strength of paper is affected by the length of time that the resin is aged in the acid solution. When the resin solution is dilute, i.e. contains less than 5% resin solids, 5–15 hours at room temperature are usually required for the development of optimum efficiency and little improvement is obtained by aging the dilute resin solutions for longer periods. Such dilute resin solutions are very stable and can be stored for up to 30 days at room temperature without adversely affecting the properties and efficiency of the cationic resin. In more concentrated resin solutions, i.e. those containing more than 10% resin solids, the efficiency of the resin develops more rapidly, usually within 3–5 hours at room temperature. Such concentrated resin solutions are relatively unstable, however, and after the cationic resin develops its maximum efficiency, on further aging, it rapidly loses its efficiency and eventually forms a non-water dispersible precipitate. Such precipitates are usually formed after about 7 hours at room temperature. In a preferred procedure, the resin is aged about 3 hours at room temperature in a concentrated solution, e.g. at 10–15% resin solids, and thereafter is diluted to less than 5% resin solids and stored until used.

The cationic resin colloids employed in the practice of the present invention are claimed and more fully described in my copending application Serial Number 586,655, filed of even date herewith, now U.S. 2,863,842, and that description is incorporated herein by reference.

The wet strength papers of this invention can be prepared by applying the cationic, sulfite-modified, melamine-formaldehyde resin to the paper fibers in any known manner. The most practical method for preparing the wet strength paper is to add a small quantity of the cationic resin to the paper furnish at any point prior to the preparation of the sheet therefrom. If desired, however, the cationic resin may be applied to the paper fibers in other known manners, e.g. as by impregnating semifinished paper sheets with a solution of the cationic resin colloid. The amount of cationic resin applied to the paper is that customarily employed with other wet strength resins, viz., from about 0.1% to about 5.0% by weight based on the dry paper.

The wet strength papers of this invention have three very important characteristics which distinguish them from wet strength papers prepared from previously known melamine-formaldehyde resins. First, the papers of this invention have higher ultimate wet tensile strengths than wet strength papers hereto available. Secondly, the papers of this invention have a higher percentage of their ultimate wet tensile strength as manufactured than do wet strength papers of the prior art. The combination of these two factors leads to wet tensile strength values in the paper as manufactured that are frequently 25–35% higher than the values that can be obtained in similarly prepared paper employing the wet strength resins previously available to the art. Thirdly, the papers of this invention have appreciably higher brightness values, i.e. appear whiter, than do paper manufactured from previously known melamine-formaldehyde resins, cf. Example XI. The differences in brightness values that can be obtained, i.e. up to 6 units, are considered to be highly significant in the paper art.

The above descriptions and particularly the examples are set forth by way of illustration only. Many other variations and modifications thereof will be obvious to those skilled in the art and can be made without departing from the spirit and scope of the invention herein described.

What is claimed is:

1. A process for preparing paper having high wet tensile strength which comprises adding to an aqueous suspension of cellulosic paper-making fibers a water-dispersible, acid-aged, cationic, sulfite-modified, melamine-formaldehyde resin and forming the treated cellulosic fibers into a waterlaid sheet, the quantity of resin added to the suspension of cellulosic paper-making fibers being sufficient to enhance the wet tensile strength of the waterlaid sheet; said water-dispersible, acid-aged, cationic, sulfite-modified, melamine-formaldehyde resin having been prepared by dispersing and aging a sulfite-modified, melamine-formaldehyde resin in an aqueous solution having a pH of 0.5–3.5, said sulfite-modified, melamine-formaldehyde resin, before acid-aging, containing 2.5–4.5 mols of formaldehyde and up to 0.2 mol of sulfonate groups per mol of melamine and having a viscosity of at least about 300 centipoises when measured in a 55% aqueous solution at 25° C.

2. A process as in claim 1 wherein said aqueous solution has a pH of 1.5–2.5.

3. A process as in claim 1 wherein said aqueous solution is an aqueous solution of hydrochloric acid.

4. A paper sheet prepared by the method of claim 1.

5. A process as defined in claim 1 wherein the quantity of resin added to the aqueous suspension of cellulosic paper-making fiber constitutes 0.1–5.0% of the dry weight of the paper-making fibers.

6. A process as in claim 5 wherein the sulfite-modified, melamine-formaldehyde resin, before acid-aging, contains 3.0–4.0 mols of formaldehyde and 0.10–0.18 mol of sulfonate groups per mol of melamine.

7. A process as defined in claim 5 wherein the sulfite-modified, melamine-formaldehyde resin, before acid-aging, contains about 3.6 mols of formaldehyde and approximately 0.12–0.15 mol of sulfonate groups per mol of melamine.

References Cited in the file of this patent

UNITED STATES PATENTS

| | | |
|---|---|---|
| 2,047,599 | Auten | Sept. 10, 1946 |
| 2,559,220 | Maxwell | July 3, 1951 |

FOREIGN PATENTS

| | | |
|---|---|---|
| 611,244 | Great Britain | Oct. 27, 1948 |
| 636,892 | Great Britain | May 10, 1950 |
| 654,305 | Great Britain | June 13, 1951 |

UNITED STATES PATENT OFFICE
CERTIFICATE OF CORRECTION

Patent No. 2,949,396                      August 16, 1960

Francis A. Bonzagni

It is hereby certified that error appears in the printed specification of the above numbered patent requiring correction and that the said Letters Patent should read as corrected below.

Column 10, line 30, list of references cited, under "UNITED STATES PATENTS", for "2,047,599" read -- 2,407,599 --.

Signed and sealed this 11th day of April 1961.

(SEAL)

Attest:

ERNEST W. SWIDER
Attesting Officer

ARTHUR W. CROCKER
                                         Acting Commissioner of Patents